(12) United States Patent
Schulist

(10) Patent No.: US 7,653,021 B2
(45) Date of Patent: Jan. 26, 2010

(54) EVALUATING ORTHOGONAL CODES TRANSMITTED IN A WIRELESS COMMUNICATIONS NETWORK

(75) Inventor: Matthias Schulist, Erlangen (DE)

(73) Assignee: Telefonaktiebolaget LM Ericsson (publ0, Stockholm (SE)

( * ) Notice: Subject to any disclaimer, the term of this patent is extended or adjusted under 35 U.S.C. 154(b) by 583 days.

(21) Appl. No.: 10/529,396

(22) PCT Filed: Sep. 27, 2002

(86) PCT No.: PCT/EP02/10888

§ 371 (c)(1),
(2), (4) Date: May 11, 2005

(87) PCT Pub. No.: WO2004/030235

PCT Pub. Date: Apr. 8, 2004

(65) Prior Publication Data

US 2005/0271000 A1  Dec. 8, 2005

(51) Int. Cl.
*H04W 4/00* (2009.01)
*H04B 7/08* (2006.01)
*H04B 17/02* (2006.01)

(52) U.S. Cl. ........................ 370/328; 370/441
(58) Field of Classification Search ........ 370/310, 370/328, 430, 441; 455/133–136
See application file for complete search history.

(56) References Cited

U.S. PATENT DOCUMENTS

| 6,493,395 | B1 * | 12/2002 | Isaksson et al. | ............. | 375/261 |
| 6,876,694 | B2 * | 4/2005 | Komatsu | ............. | 375/148 |
| 7,035,315 | B2 * | 4/2006 | Sung | ............. | 375/147 |
| 7,324,465 | B2 * | 1/2008 | Lim et al. | ............. | 370/278 |
| 2003/0137956 | A1 * | 7/2003 | Salehi et al. | ............. | 370/335 |

FOREIGN PATENT DOCUMENTS

| EP | 1 134 907 A2 | 3/2001 |
| WO | 01/78269 A1 | 10/2001 |
| WO | 02/23840 A1 | 3/2002 |

(Continued)

OTHER PUBLICATIONS

International Search Report of PCT/EP02/10888 mailed Mar. 3, 2003.

(Continued)

*Primary Examiner*—Patrick N Edouard
*Assistant Examiner*—Michael T Thier
(74) *Attorney, Agent, or Firm*—Nixon & Vanderhye P.C.

(57) ABSTRACT

The invention relates to a method, a computer program product and a device for evaluating a code which is orthogonal to one or more further codes. The method comprises the steps of receiving a signal which carries a code containing a sequence of code symbols, determining for a particular symbol instant at least one channel estimate, determining for the particular symbol instant a compensation value taking into account the at least one channel estimate, compensating each code symbol using the compensation value determined for the corresponding symbol instant, wherein the compensation is performed such that an original power relationship among the individual code symbols contained in the code is restored, and evaluating the code on the basis of the sequence of compensated code symbols exploiting the orthogonality to further codes.

16 Claims, 7 Drawing Sheets

FOREIGN PATENT DOCUMENTS

WO 02/063814 A2 8/2002

OTHER PUBLICATIONS

Schulist et al., Link Level Performance Results for a WCDMA Random Access Scheme with Preamble Power Ramping and Fast Acquisition Indication, Vehicular Technology Conference, VTC 1999—Fall, IEEE VTS 50$^{th}$, vol. 5, pp. 2581-2585.

3GPP TS 25.211 V3.11.0 (Jun. 2002); Physical channels and mapping of transport channels onto physical channels (FDD) (Release 1999).

3GPP TS 25.212 V3.10.0 (Jun. 2002); Multiplexing and channel coding (FDD) (Release 1999).

3GPP TS 25.213 V3.8.0 (Jun. 2002); Spreading and modulation (FDD) (Release 1999).

3GPP TS 25.214 V3.10.0 (Mar. 2002); Physical layer procedures (FDD) (Release 1999).

3GPP TS 25.214 V4.4.0 (Mar. 2002); Physical layer procedures (FDD) (Release 4).

3GPP TS 25.215 V4.4.0 (Mar. 2002); Physical layer—Measurements (FDD) Release 4).

* cited by examiner

EVALUATING ORTHOGONAL CODES TRANSMITTED IN A WIRELESS COMMUNICATIONS NETWORK

This application is the US national phase of international application PCT/EP2002/010888 filed 27 Sep. 2002 which designated the U.S., the entire content of which is hereby incorporated by reference.

TECHNICAL FIELD

The invention relates to the field of evaluating signals and in particular access signals modulated on codes that are transmitted in a wireless communications network. More specifically, the invention relates to evaluation schemes that exploit the knowledge that a received code is orthogonal to one or more further codes.

BACKGROUND

Modern wireless communications networks employ different access techniques when a first network component intends to access a second network component. As an example for such access techniques the so-called random access (RA) scheme can be mentioned. The name "random access" indicates that access requests are generated in a random manner from the point of view of a network component receiving the access requests.

An exemplary RA scheme is specified by the $3^{rd}$ Generation Partnership Project (3GPP) in section 6 of the 3GPP document TS 25.214, Version 4.4.0 (2002-03) titled "Technical Specification Group Radio Access Network; Physical Layer Procedures (FDD); Release 4". Another exemplary RA scheme has been defined by standardization bodies for the Global System of Mobile Communications (GSM).

In RA schemes there may arise the situation that several network components simultaneously try to access a specific further network component, i.e. that access requests of different network components "collide". Such collisions are detrimental to the quality of service since they result in access delays, message losses, etc. Consequently, various techniques have been introduced to avoid or reduce the detrimental effects of collisions inherent in RA schemes.

For example it has been proposed to implement repetition schemes according to which a specific network component repeatedly transmits its access request. A second way of reducing collisions inherent in RA schemes is to group the network components into specific access classes. The definition of such access classes can prohibit whole populations of network components the transmission of access requests based on their membership to a specific access class. Furthermore, collisions may be avoided or reduced by differentiating between access requests of different network components. To that end each access request may comprise a particular identification code, also called "random discriminator" (GSM) or "signature" (3GPP), which allows a network component that receives two or more access requests simultanueously to discriminate between random access requests of different network components.

An exemplary scheme for random access signaling on the basis of orthogonal codes is described in Matthias Schulist, Georg Frank, "Link Level Performance Results for a WCDMA Random Access Scheme with Preamble Power Ramping and Fast Acquisition Indication", Proc. of VTC'99.-Fall. According to this random access signaling scheme a network component requesting access to a network resource randomly selects an identification code out of a set of predefined orthogonal codes and modulates the selected identification code onto a preamble signal. This preamble signal constitutes an access request that is transmitted to a further network component controlling access to the network resource. This further network component analyzes the received preamble signal with respect to the identification code modulated thereon and broadcasts an access control signal. The access control signal carries the analyzed identification code together with an indicator which indicates whether or not the access request associated with the analyzed identification code is granted.

In conjunction with the code-based signaling scheme discussed above and other signaling schemes that are based on the transmission of orthogonal codes there arises the necessity to evaluate the code that has been modulated onto a received signal. During such an evaluation the fact may be exploited that the received code is orthogonal to one or more further codes. However, due to imperfections of the transmission channel the received and demodulated code has lost its orthogonality to a certain extent. This loss of orthogonality makes the evaluation of the received and demodulated code more difficult and gives rise to evaluation errors.

There is a need for an improved mechanism which renders the evaluation of an initially orthogonal code that has been transmitted over an imperfect channel more reliable. In particular, there is a need for a method, a computer program product and a device for implementing such an evaluation mechanism.

SUMMARY

This need is satisfied by a method of evaluating a code which is orthogonal to one or more further codes, the method comprising receiving, preferably over a non-power controlled channel, a signal which carries a code containing a sequence of code symbols, determining for a particular symbol instant at least one channel estimate, determining for the particular symbol instant a compensation value taking into account the at least one channel estimate, compensating each code symbol using the compensation value determined for the corresponding symbol instant, wherein the compensation is performed such that an original power relationship among the individual code symbols contained in the code is restored, and evaluating the code on the basis of the sequence of compensated code symbols exploiting the orthogonality to further codes.

The symbol-based compensation approach results in an increased orthogonality of the code received via the imperfect transmission channel. This quasi-re-orthogonalization improves the reliability of the code evaluation process and facilitates any decision mechanisms involved therein. Such decision mechanisms may for example relate to deciding if the received code is identical with a specific code that is known to the device performing the code evaluation process. Alternatively or additionally, the code evaluation process may also relate to other aspects like determining if the received code belongs to a predefined set of codes or which code out of a predefined set of codes has been received.

In the case it has to be determined if the received code is identical with a specific (known) code (e.g. a previously received or transmitted code) or which code out of a predefined set of codes has been received, the code evaluation process may comprise associating the sequence of compensated code symbols of the received code with one or more known code symbol sequences.

The step of evaluating the received code and in particular the step of determining if the received code is identical with the known code may comprise a comparison with a constant or continuously adapted threshold. For example if the sequence of compensated code symbols is associated with a known sequence of code symbols, a comparison of the result of such an association with a threshold may be performed. The threshold may be determined taking into account various power levels. For example the threshold can be determined on the basis of a ratio between a power level used on an access signaling channel and a power level used on a channel for pilot transmission.

According to a preferred variant, the compensation of the individual code symbols is performed such that the individual code symbols of a received code symbol sequence are power-wise set in the same relation with respect to each other as they have originally been transmitted. Such a compensation strategy, which can advantageously be implemented on the basis of the symbol-based compensation approach, is particularly useful in the case of fast fading channels when the channel properties vary strongly during transmission of a single code symbol sequence.

Preferably, the compensation not only takes place with respect to a power compensation over the length of a code symbol sequence. In conjunction with the compensation different propagation paths that contribute to the transmission of an individual code symbol may be taken into account. In principle the signal carrying the code may be received via one propagation path or via multiple propagation paths. In the case of multipath propagation for several or all propagation paths an individual channel estimate can be determined. The compensation value for a particular symbol instant may then be determined taking into account the individual channel estimates determined for this symbol instant for the plurality of propagation paths. Compensation may be performed such that weak propagation paths are treated with a lower significance than strong propagation paths.

The compensation value used for compensating an individual code symbol can be a multiplicative compensation factor c[k]. Preferably, c[k] is calculated for a specific symbol instant k according to $$c[k] = \frac{1}{\sum_{l=1}^{L} a_l \cdot |\hat{g}_l[k]|^2},$$

wherein L is the number of propagation paths to be taken into account, $a_l$ is a weighting factor for an individual propagation path l, and $\hat{g}_l[k]$ is the channel estimate for propagation path l. Especially in the case of unknown propagation scenarios, the weighting factor $a_l$ can be set to 1.

The received code which is to be evaluated can serve for various purposes. Preferably, the code is used for signaling purposes. In an access signaling context for example the code may be used by a particular network component requesting access to a network resource to identify itself or the code may be used by a network component controlling access to a network resource to address (e.g. for control purposes) the access requesting network component. In the first case the access controlling network component receiving the code may evaluate the code to determine which code has been received. In the second case the addressed network component may evaluate the received code with respect to the question if this code is identical with a code that has previously been used by this network component to identify itself.

The code may be received via a transmission channel which is different from the transmission channel based on which the channel estimates are determined. For example the code may be received via a first channel and the channel estimates may be determined on the basis of information received via a second channel which is different from the first channel. Preferably, the code received via the first channel (in a 3GPP network for example the Acquisition Indicator CHannel AICH or the Physical Random Access CHannel PRACH) can be used in a random access signaling context and/or the second channel (in a 3GPP network for example the Common PIlot CHannel CPICH) may be used for receiving signals carrying information having a known content like pilot signals.

The channel estimate for a specific symbol instant (and a specific propagation path) may be calculated as the "running" average over a number of symbol instants. Additionally or alternatively, a Doppler shift adaptation of the channel estimates may be performed. In the case the channel estimates are averaged over a number of symbol instants, the Doppler shift adaptation can be performed by adapting the number of channel estimates taken into account during a single averaging step to the maximum Doppler shift. Additional or alternative mechanisms to improve the symbol-based channel estimates could be implemented.

The technology can be practiced as a hardware solution and as a computer program product comprising program code portions for performing the steps of the invention when the computer program product is run on a network component. The computer program product may be stored on a computer readable recording medium.

The hardware solution includes a receiver for receiving a signal carrying a code which contains a sequence of code symbols and which is orthogonal to one or more further codes. The receiver according to the invention comprises an estimator for determining for a particular symbol instant at least one channel estimate, a compensator for determining for the particular symbol instant a compensation value taking into account the at least one channel estimate and for compensating each code symbol using the compensation value determined for the corresponding symbol instant, wherein the compensation is performed such that an original power relationship among the individual code symbols contained in the code is restored, and an evaluator for evaluating the code on the basis of the sequence of compensated code symbols exploiting the orthogonality to further codes.

The receiver may be configured as a RAKE receiver. If a RAKE receiver is used, the code symbols may for example be obtained as the maximum ratio combined output signal of the RAKE receiver. The RAKE receiver may be shared for the reception on two or more different logical channels. For example in the random access signaling scenario described above, the RAKE receiver may be used for simultaneous reception on the AICH and the CPICH. However, additional or alternative channels may be received and demodulated by the RAKE receiver also.

DETAILED DESCRIPTION

In the following, the technology will exemplarily be set forth with respect to a wireless communications system according to the 3GPP specification. In particular, the invention will be described in context with the RA scheme defined in section 6 of the 3GPP document TS 25.214, Version 4.4.0 (2002-03) titled "Technical Specification Group Radio Access Network; Physical Layer Procedures (FDD); Release 4". It should be noted, however, that the invention could also be practiced in any other wireless communications system like CDMA 2000.

Furthermore, although described in context with network components in the form of user equipments (UEs) requesting access to a common network component configured as a base station (BS), the technology is not limited to such specific network components. In particular, the technology is not limited to the "random access signaling" functionality described hereinafter. Other signaling functionalities apart from access control could be implemented as well.

Figure 1:
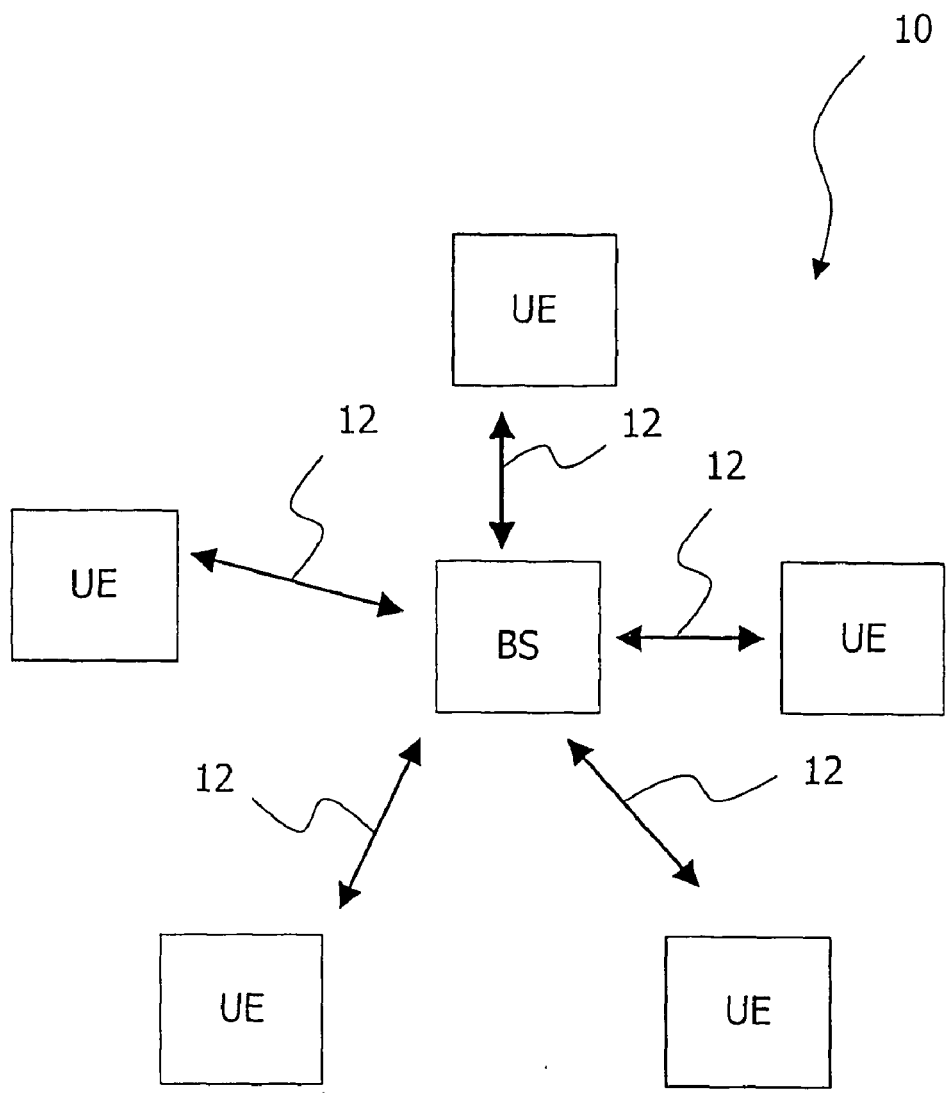
FIG. 1 schematically shows the topography of a wireless communications network.

In FIG. 1 an exemplary 3GPP wireless communications network 10 is depicted. As becomes apparent from FIG. 1, the network 10 comprises a central network node in the form of a base station BS and a plurality of user equipments UEs in the form of e.g. mobile telephones, personal digital assistants (PDAs), etc.

Communications between the base station BS and the individual user equipments UEs are performed over individual transmission paths 12. In FIG. 1 between the base station BS and each user equipment UE only a single transmission path 12 is shown. It should be kept in mind, however, that in reality multipath propagation occurs.

3GPP has defined an RA scheme for its FDD (WCDMA) mode in the 3GPP specifications TSG-RAN WG1 TS25.211 to TS 25.215. The 3GPP RA scheme provides benefits from both an access delay and a power efficiency point of view. The RA scheme comprises a reverse link (uplink, UL) component that stretches from the user equipment UE towards the base station BS and a forward link (downlink, DL) component that stretches from the base station BS to the user equipment UE. The UL component is called Physical Random Access CHannel (PRACH) and the DL component is called Acquisition Indicator CHannel (AICH). In general, the UL PRACH is used for transmitting access request signals and messages to the base station, while the DL AICH is used to transmit to the user equipment UE access control information generated in response to detection of an access request.

Figure 2:
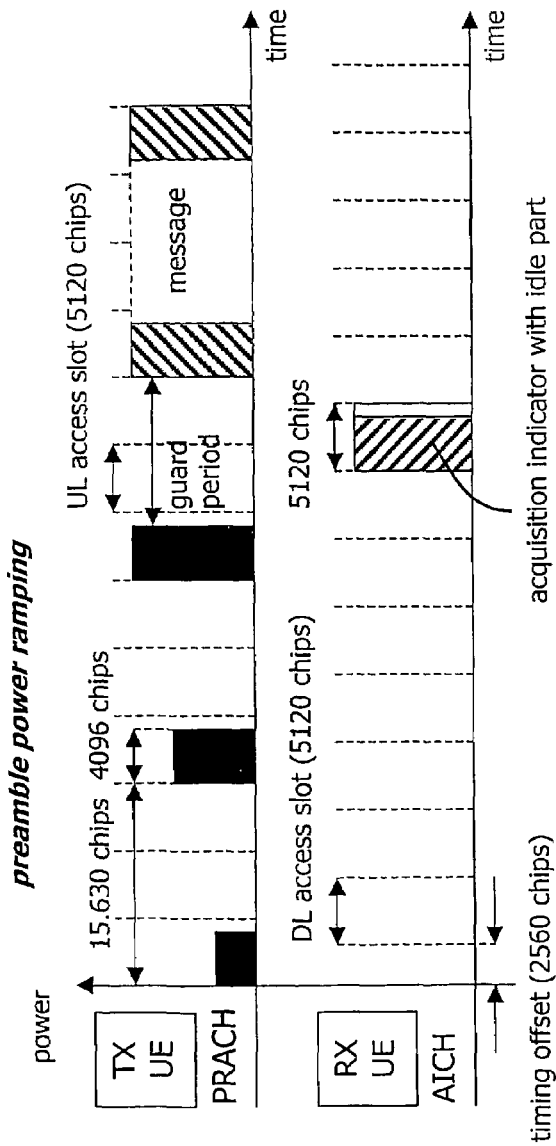
FIG. 2 schematically shows a random access scheme.

FIG. 2 shows a sketch of the 3GPP WCDMA RA scheme. In the following, this RA scheme will briefly be described.

In the upper half of FIG. 2 the UL PRACH is depicted. The UL PRACH is divided into a plurality of individual access slots having a length of 5120 chips each. At a chip rate of 3.84 Mchips/s this corresponds to an access slot length of 1.33 ms. Each time a user wishes to e.g. set up a call, his user equipment UE randomly selects one UL access slot out of a predefined set of access slots (slotted ALOHA concept).

Each access on the PRACH is divided into two distinct phases which are separated by an acquisition indication phase on the AICH. During the first phase an access request signal in the form of a preamble is repeatedly sent on the PRACH. During the second phase, which is initiated in response to receipt of a positive preamble acknowledgement on the AICH, a message is sent on the PRACH. Thus, the UL PRACH frame format consists of one or several preambles, each preamble having a length of 4096 chips ($\approx 1$ ms) and being followed by a guard period of a flexible length and a message part of 10 or 20 ms. Preamble and guard period timing are matched to the RA access slot structure to allow an exact UL time frame alignment of the message part.

As can be seen from FIG. 2, the access request signal (preamble) repeatedly transmitted by the user equipment UE on the UL PRACH is subjected to power ramping. During the preamble power ramping phase, the preamble power level on the UL PRACH is steadily increased by the user equipment UE starting at a properly chosen initial power level. The initial power level may for example be determined by estimating the path loss taking known base station transmit power and interference levels into account.

Figure 3:
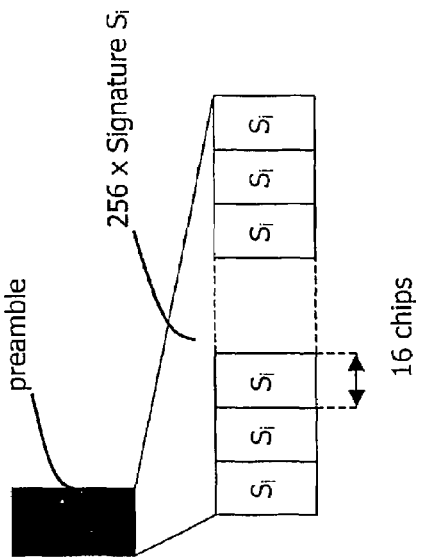
FIG. 3 schematically shows the structure of an access request having the form of a preamble signal.

The structure of the preamble, i.e. of the access request signal, is depicted in FIG. 3. As can be gathered from FIG. 3, the preamble is a sequence of 256 repetitions of a signature code (or simply "signature") $S_i$ of length 16 chips.

The preamble signatures are used as identification codes to avoid or reduce the collision probability of preambles (access requests) originating from different network components. To that end 3GPP specifies sixteen signatures in the form of orthogonal codes (Walsh sequences) that according to the 3GPP specification are randomly selected by the user equipment UE during each access attempt.

A user equipment UE requesting access repeatedly transmits randomly selected preambles at an increasing power level until the latest preamble is detected at the base station BS. Having identified the preamble signature code, the base station BS transmits an immediate ("fast") acquisition indicator (AI) on the DL AICH as illustrated in the lower half of FIG. 2. As becomes apparent from FIG. 2, there is a timing offset between the UL PRACH and the DL AICH access slots.

Figure 4:
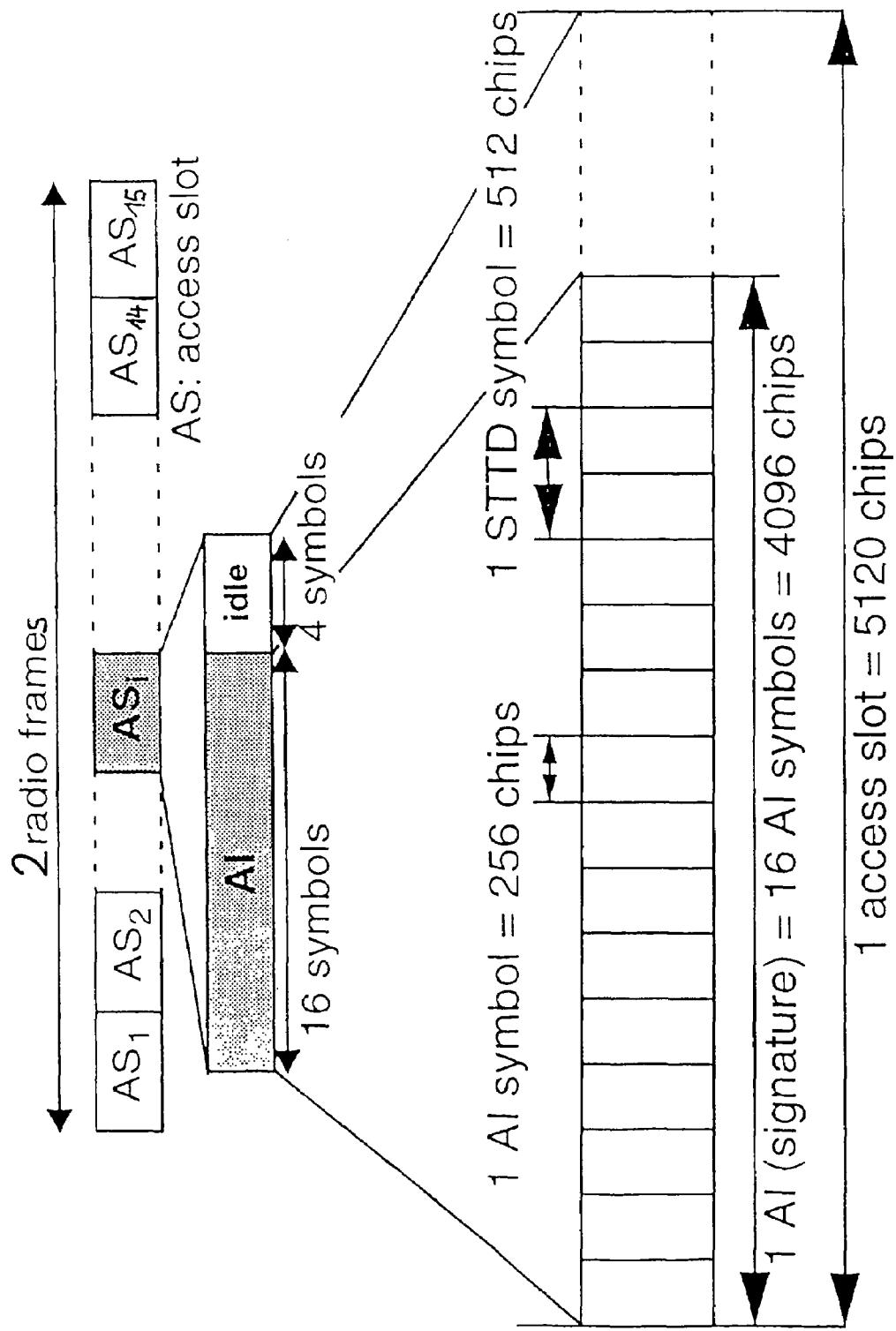
FIG. 4 schematically shows the structure of an acquisition indicator serving as access control information.

According to the DL AICH frame format depicted in FIG. 2 and FIG. 4, a radio frame is divided into access slots having a duration of 5120 chips each. Thus, the DL AICH access slot structure exactly corresponds to the UL PRACH slot structure. Each access slot on the DL AICH consists of an AI part having a length of 4096 chips followed by an idle time of length 1024 chips (see FIG. 4). The AI part (or simply "AI") of each access slot consists of the symbol-wise combination of sixteen complex orthogonal codes $a_1 \ldots a_{16}$, each code having a duration of 4096 chips after spreading. The codes $a_1 \ldots a_{16}$ match one to one the preamble signatures used on the UL PRACH. Any successfully received preamble on the UL PRACH carrying a specific signature code is assigned the corresponding AI code on the DL AICH. Therefore, the codes $a_1 \ldots a_{16}$ are also called AI signature codes (or simply "AI signatures"). This allows a requesting user equipment UE being aware of its own preamble signature code to fetch the correct AI signature code on the DL AICH. Referring to FIG. 4, each AI signature code consists of sixteen AI code symbols.

An AI constitutes an access control signal and carries information relating to the following contents:

AI=1: positive preamble acknowledgement: preamble detected, user equipment UE should send message;

AI=0: preamble not detected: re-send preamble at an increased power level;

AI=−1: negative preamble acknowledgement: preamble detected, user equipment UE should not send message.

The case A=0 thus essentially means that the respective AI signature is not transmitted at all.

Figure 5:
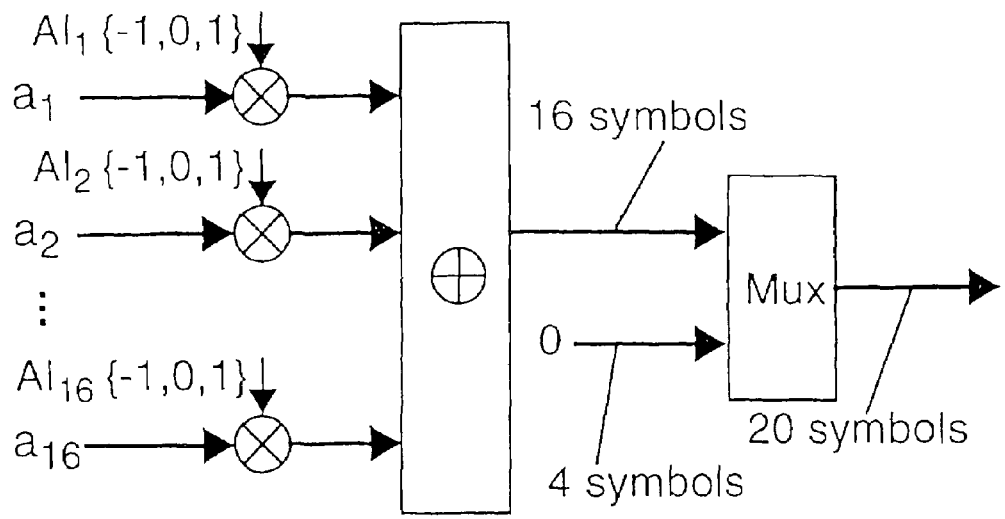
FIG. 5 schematically shows the generation of access control information.

The generation of AICH information per access slot is schematically shown in FIG. 5. As becomes apparent from FIG. 5, during one access slot access control information for up to sixteen access requesting user equipments UEs can be transmitted on the DL AICH. This is due to the fact that the sixteen codes $a_1 \ldots a_{16}$ are orthogonal with respect to each other.

Figure 6:
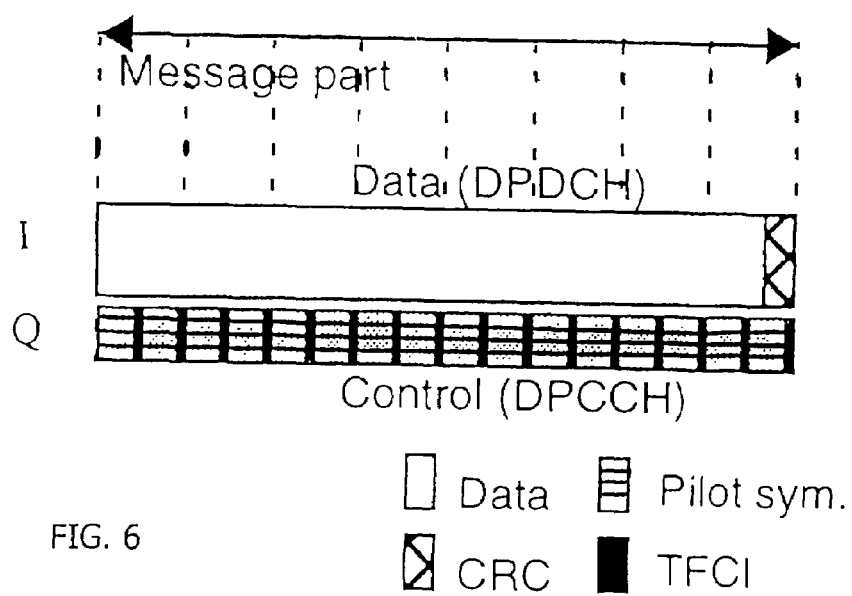
FIG. 6 schematically shows the structure of a message sent in response to a positive access control information.

A user equipment UE monitors during the guard period following the transmission of a preamble on UL PRACH whether or not an AI including an AI signature code corresponding to the preamble signature code modulated onto the previously sent preamble(s) is detected on DL AICH. If this is the case, the dedicated access control information included in the AI is assessed. In the case of a positive acknowledgement (AI=1), the message is sent by the user equipment UE at the next UL PRACH access slot after AI transmission and reception. In the case of a negative acknowledgement (AI=−1), the user equipment UE refrains from sending the message and aborts preamble power ramping. In the case the respective AI signature is not detected (AI=0), the user equipment UE continues with preamble power ramping. The format of a message sent on UL PRACH in the case of AI=1 is schematically depicted in FIG. 6. The message part occupies one or two radio frame(s). Data is transmitted in the "I" branch, referred as to as Dedicated Physical Data CHannel (DPDCH). Pilot symbols and control information like Transport Format Combination Indicators (TFCIs) are transmitted in the "Q" branch, called the Dedicated Physical Control CHannel (DPCCH). The data transmission on DPDCH is concluded with the transmission of a Cyclic Redundancy Code (CRC). As becomes apparent from FIG. 2, the message may be sent at the same transmit power level as the last preamble signal, i.e. as the preamble signal that gave rise to the AI on the DL AICH, or at a transmit power level having a power offset with respect to the transmit power level of the last preamble signal.

In order to avoid access delays and excessively high preamble and message power levels, secure detection of an AI that was sent by the base station BS on the DL AICH to the user equipment UE has to be ensured in different transmission propagation scenarios. This is reflected by the so-called detection probability that should ideally approach 100%. In addition, and in particular to avoid high access delays and increased interference levels in the base station BS, AIs that were actually not transmitted by the base station BS should not give rise to corresponding detection results by any user equipment UE. This is reflected by the so-called false alarm or imitation probability that should ideally approach 0%.

In order to simultaneously ensure a high detection probability, a low false alarm probability and low interference levels, transmit power levels for the AIs should be chosen carefully. However, since the base station BS is not informed about the path loss to an access requesting user equipment UE, it usually selects the maximum available power as to guarantee sufficient AI detection and false alarm performance. In this respect the AICH is somewhat similar to the CPICH that determines the cell size covered by the base station BS. Some predictions estimate a transmit power of 2 to 4 W for the CPICH. This would mean between 1.6 to 12.8 W mean power to be spent for an AICH when a continuous traffic of 1 to 4 simultaneous AIs on AICH is assumed.

Since AI transmissions on AICH are not subjected to a power control mechanism, large signal amplitude variations may occur on the AICH. Consequently, a fixed threshold AI detection scheme as described in Matthias Schulist, Georg Frank, "Link Level Performance Results for a WCDMA Random Access Scheme with Preamble Power Ramping and Fast Acquisition Indication", Proc. of VTC'99.-Fall does not always provide reliable results. Furthermore, it has been noticed that the reliability gets worse in the case of high Doppler shifts, i.e. high speeds of a user equipment UE. The negative effects of high Doppler shifts get stronger the more AIs are transmitted in parallel on the AICH. One explanation for this is the fact that due to distortions on fast fading channels the orthogonality of the AI signature codes gets lost.

Figure 7:
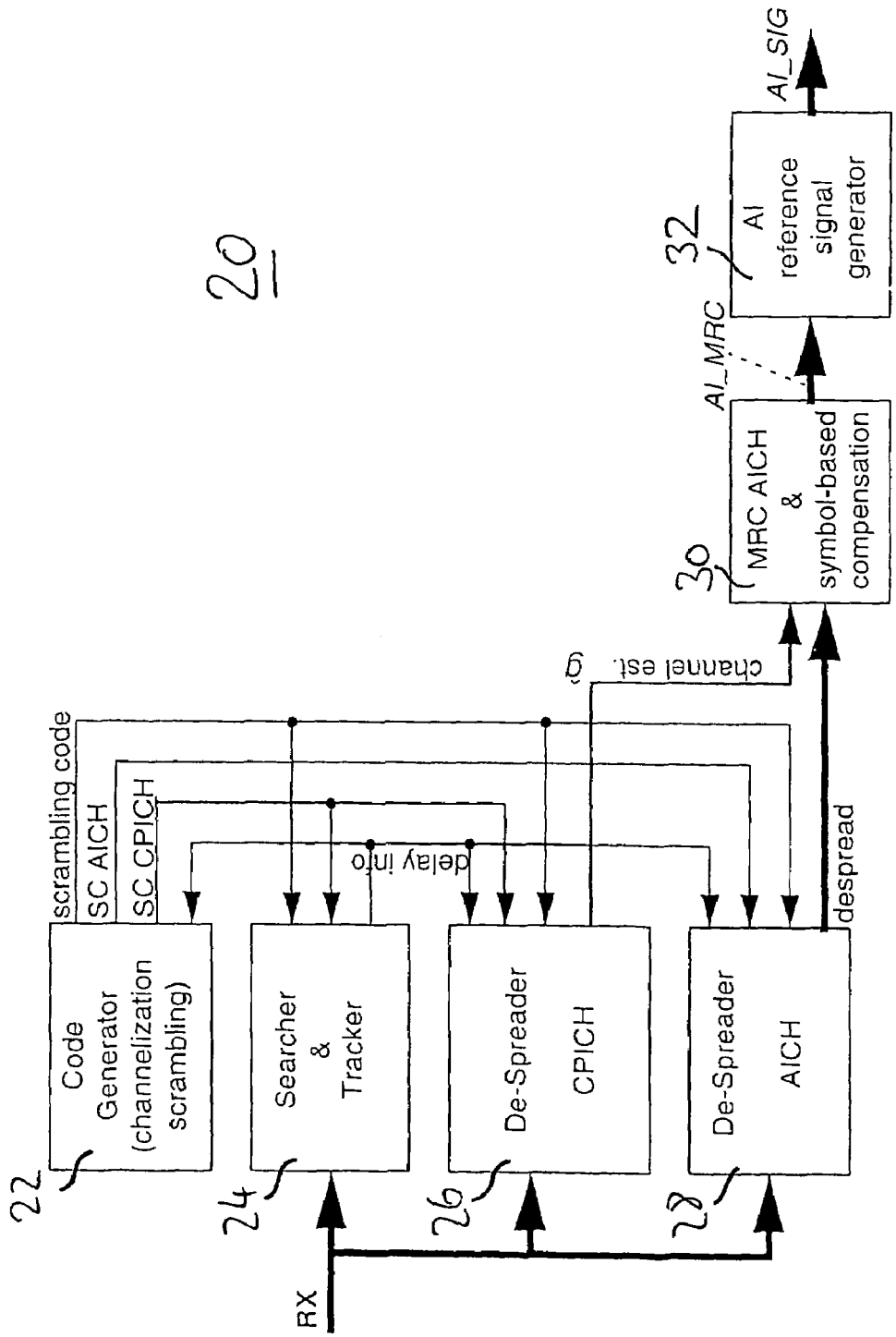
FIG. 7 schematically shows the units of a user equipment involved in a code reception and evaluation procedure.

To restore the orthogonality of the AI signature codes, a reception approach as depicted in FIG. 7 may be used. In the exemplary embodiment discussed hereinafter with reference to FIG. 7, the AI reception on AICH exploits the transmission on CPICH. Since it is assumed that transmission and reception on CPICH is performed continuously, the user equipment UE can use the respective receiver and searching/tracking resources for reception on the AICH as well.

In FIG. 7 a RAKE based AICH receiver 20 of a user equipment UE is depicted. The AICH receiver 20 is active during the designated DL access slot of each guard period following a preamble signal that has previously been sent by the user equipment UE. During the guard period the AICH receiver 20 scans the AICH for the AI information modulated on an AI signature code that corresponds to the signature code which the user equipment UE previously modulated on the preamble signal. In other words, the AICH evaluates received AI signature codes with respect to the question if one of the received AI signature codes is identical with the preamble signature code that has previously been used to identify an access request of the user equipment UE.

As becomes apparent from FIG. 7, the AICH receiver 20 comprises a code generator 22 and a searcher/tracker 24 which are shared by a despreader 26 for the CPICH on the one hand and a despreader 28 for the AICH on the other hand. The receiver 20 further comprises an MRC AICH unit 30 and an AI reference signal generator 32.

The searcher/tracker 24, the CPICH despreader 26 and the AICH despreader 28 receive a signal RX including CPICH and AICH information. The channel estimates are delivered on a symbol-basis from demodulation of the CPICH in the CPICH despreader 26. In order to remove the noise component of the estimated channel tap weights, an averaging of a number of channel estimates is applied in the CPICH despreader 26:

$$\hat{g}_l[k] = \sum_{i=k-N_{aver}+1}^{k} \tilde{g}_l[i]/N_{aver}$$

where $\hat{g}_l[k]$ is the channel estimate for propagation path l at symbol instant k and $\tilde{g}_l[k]$ is the complex channel tap weight directly calculated from demodulating the DPICH at symbol instant k. The number of averaged "raw" weights can be adapted to the maximum Doppler shift according to $$N_{aver} = \text{round}\left(\frac{1}{10 \cdot 2 f_{Doppler} \cdot t_{symbol}}\right)$$

where $f_{Doppler}$ is the maximum Doppler shift and $t_{symbol}$ is the symbol duration. The Doppler shift adaptation can be omitted in the case there is no or only a small Doppler shift (e.g. in the case of stationary user equipments UEs).

The AICH despreader 28 demodulates the AICH information that has been modulated by the base station on the AICH signal and generates demodulated AI code symbols AI[k]. In the AI MRC unit 84 the following compensation operation is performed on each demodulated AI code symbol AI[k] output by the AICH despreader 28 to restore the original power relationship among the code symbols:

$$AI\_MRC[k] = \frac{1}{\sum_{l=1}^{L} |\hat{g}_l[k]|^2} \cdot \sum_{l=1}^{L} AI_l[k] \cdot \hat{g}_l[k],$$

where AI_MRC[k] is the symbol-based output signal of the MRC AICH unit 30, $AI_l[k]$ is the demodulated AI symbol for propagation path (each used RAKE finger) l, L is the number of propagation paths and $\hat{g}_l[k]$ is the symbol-based channel estimate for propagation path l and symbol instant k. For one propagation path this operation is equivalent with dividing $AI_l[k]$ with the averaged channel estimate $\hat{g}_l[k]$.

The compensation factor $$c[k] = \frac{1}{\sum_{l=1}^{L} |\hat{g}_l[k]|^2}$$

is chosen such that due to the summing operation weaker propagation paths contribute less to the compensation than stronger propagation paths.

Figure 8:
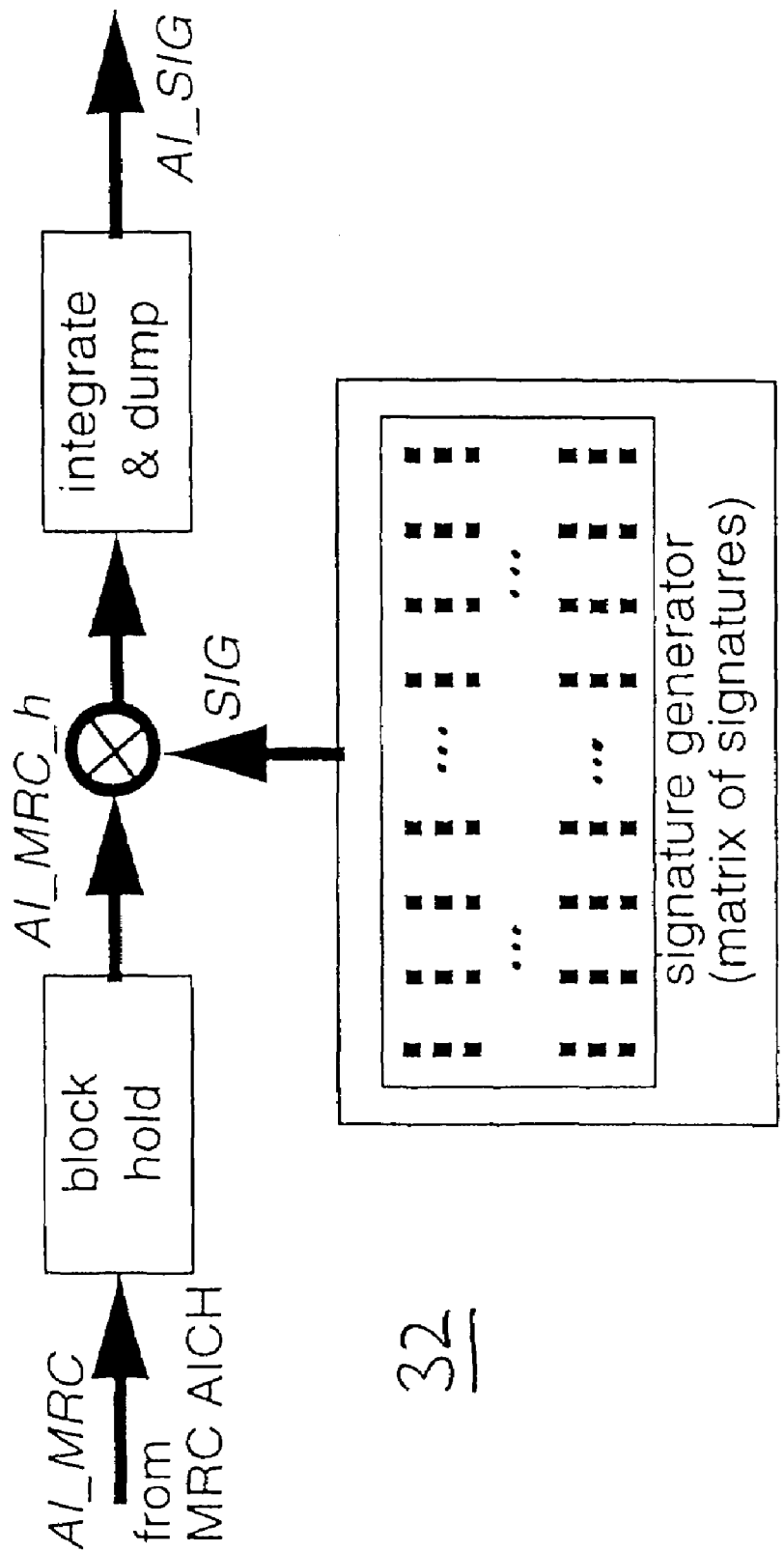
FIG. 8 schematically shows the operation performed by one of the units depicted in FIG. 7.

FIG. 8 sketches the generation process of the AI reference signal (AI_SIG) from the output signal AI_MRC of the MRC AI unit 30. This process is performed within the AI reference signal generator 32 shown in FIG. 7.

The output signal of the MRC AICH unit 30 is signature code-wise (16 code symbols) held, resulting in AI_MRC_h, and multiplied with all 16 signature codes from a reference signature matrix pre-stored in the user equipment UE. During the multiplication operation the orthogonal nature of the signatures is exploited. The multiplication operation results in 16 complex signature reference values, one for each possible signature code. This means that a positive AI sent signature will ideally (i.e. if the original orthogonality among the code symbols of a received signature code is completely restored) result in a reference value of 1, a non-sent signature will result in a reference value 0 and a negative acknowledgement will result in −1.

The respective process can be expressed by the following matrix operation:

$$\overline{AI\_SIG} = \overline{AI\_MRC} \cdot \underline{SIG}$$

Here $\overline{AI\_SIG}$ means the row vector (block) of 16 signature reference values, $\overline{AI\_MRC}$ denotes the row vector (block) of 16 AI-MRC output samples and $\underline{SIG}$ represents the (16×16) matrix of all (complex) signature codes.

It is emphasized here that comparing the signature reference signal $\overline{AI\_SIG}$ only with the specific (known) preamble signature code is in principal sufficient to identify whether the specific AI was sent or not. Such an identification is based on comparing the single signature reference value thus obtained with a fixed threshold value. The threshold value may for exemple be set in accordance with the ratio between the power level on CPICH and the power level on AICH signaled via the BCH.

Figure 9:
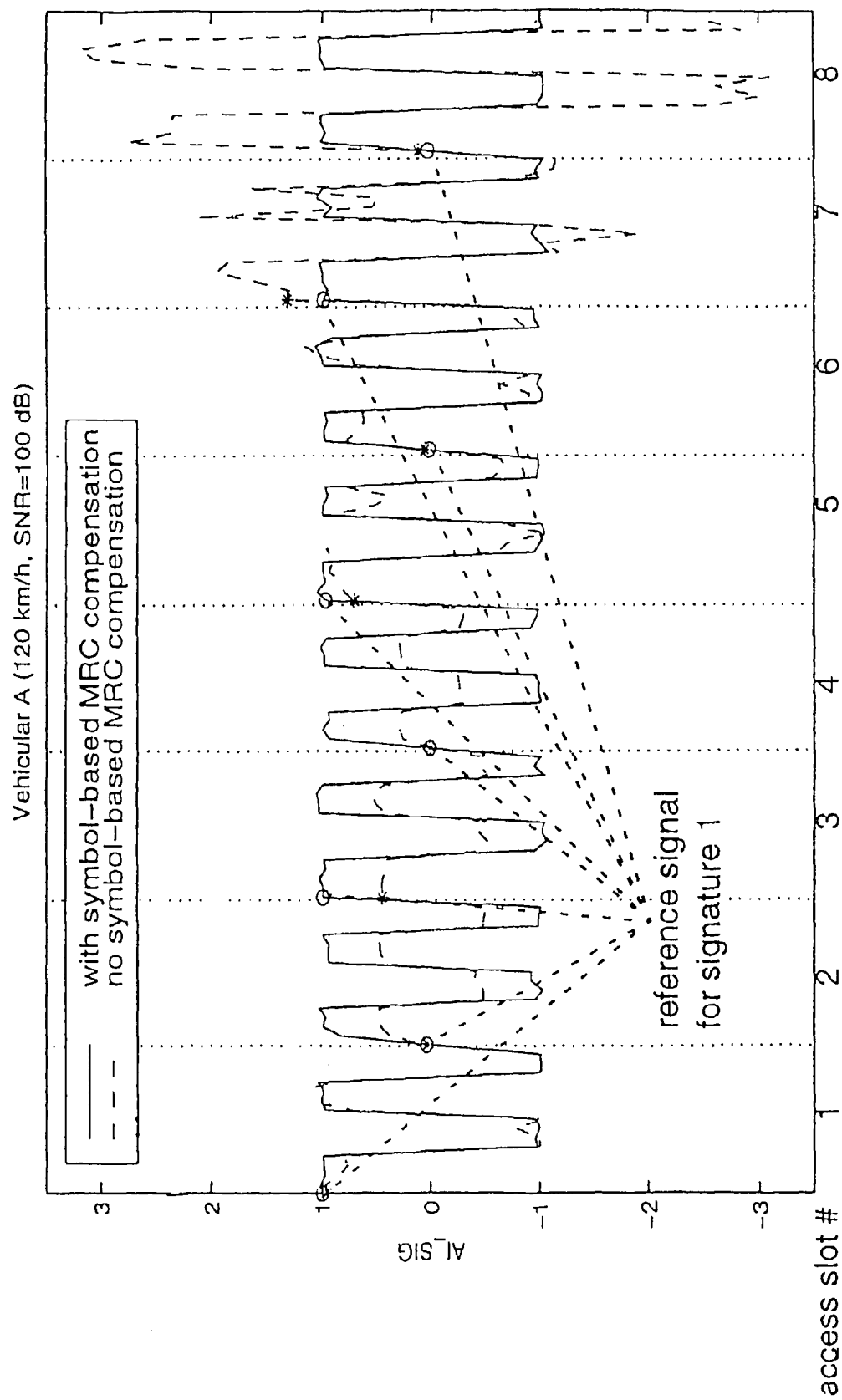
FIG. 9 shows a diagram depicting the results of a code evaluation procedure.

FIG. 9 shows a diagram which compares the AI reference signal with and without symbol-based MRC compensation for one simulated radio frame. The simulation is based on a vehicular environment (120 km/h, SNR=100 dB) using perfect channel estimates.

In the simulation used for generating the diagram depicted in FIG. 9, an access slot structure different from the structure depicted in FIG. 4 has been employed. Two different patterns of AI constellations have been used. The AI constellation used for access slots 1, 3, 5 and 7 consists of quadruples of consecutive AI numbers having alternating signs, i.e. [1,1,1,1,−1,−1,−1,−1,1,1,1,1,−1,−1,−1,−1,]. Access slots 2, 4, 6 and 8 have similar AI constellations, however, the first AI is set to 0.

As becomes apparent from FIG. 9, only slight distortions can be observed for the symbol-based compensation method due to multipath propagation and the cross-correlation properties of the scrambling sequence. These minor distortions, however, do not limit the performance and become negligible in the case additional distortions like interference and noise are also taken into account. On the other hand, strong distortions are observed in the case no compensation is performed.

In the evaluation embodiment depicted in FIG. 9, the following detection rule (i.e. distinction between the cases "AI sent" and "AI not sent") is applied:

|AI_SIG(specific)|>|threshold|?

The magnitude of the specific element within $\overline{AI\_SIG}$ corresponding to the specific AI under investigation (i.e. expected signature code) is compared to a fixed and absolute threshold. If it exceeds this threshold, it is assumed that the AI has been sent. Otherwise it is assumed that the particular AI has not been sent. The sign of the AI relates to the type of the preamble acknowledgement (positive/negative).

While embodiments of the present invention have been shown and described, various modifications may be made without departing from the spirit and scope of the present invention, and all such modifications and equivalents are intended to be covered.

The invention claimed is:

1. A method of evaluating a code which is orthogonal to one or more further codes, comprising the steps of:

receiving an access control signal on a first channel, which carries access control information and a code containing a sequence of code symbols, in response to an access request signal;

calculating at least one channel estimate from information transmitted on a second different channel using a code symbol at a particular symbol instant;

determining for the code symbol a compensation value taking into account the at least one channel estimate;

restoring a previous power relationship among the individual code symbols contained in the code by compensating each code symbol using the compensation value determined for the corresponding symbol instant; and evaluating the code on the basis of the sequence of compensated code symbols exploiting the orthogonality to the further codes.

2. The method of claim 1, wherein the step of evaluating the code comprises determining if the received code is identical with a known code and/or which code out of a predefined set of orthogonal codes has been received.

3. The method of claim 1, wherein the step of evaluating the code comprises associating the sequence of compensated code symbols with one or more known sequences of code symbols.

4. The method of claim 1, wherein the signal carrying the code is received via multiple propagation paths, wherein for the particular symbol instant individual channel estimates for at least two propagation paths are determined and wherein the compensation value for the particular symbol instant is determined taking into account the individual channel estimates determined for this symbol instant.

5. The method of claim 4, wherein in the compensation value weak propagation paths are considered with a lower significance than strong propagation paths.

6. The method of claim 1, wherein the compensation value is constituted by a compensation factor c[k] which is calculated for a specific symbol instant k according to $$c[k] = \frac{1}{\sum_{l=1}^{L} a_l \cdot |\hat{g}_l[k]|^2},$$

where L is the number of propagation paths to be taken into account, $a_l$ is a weighting factor for an individual propagation path l, and $\hat{g}_l[k]$ is the channel estimate for propagation path l.

7. The method of claim 1, wherein the code is used in an access signaling context to identify or address a particular network component requesting access to a network resource.

8. The method of claim 1, wherein the code transmitted via the first channel is used in a random access signaling context and/or wherein the second channel is used for transmitting signals carrying information that is known at a receiving side.

9. The method of claim 1, wherein the step of determining channel estimates comprises averaging for a specific propagation path each channel estimate over a number of symbol instants.

10. The method of claim 1, wherein the step of determining channel estimates comprises a Doppler shift adaptation of the channel estimates.

11. The method of claim 1, wherein the step of evaluating the code comprises a comparison with a threshold.

12. The method of claim 11, wherein the threshold is determined on the basis of a ratio between a power level used on an access signaling channel and a power level used on a channel for pilot transmission.

13. A computer readable medium storing a computer program product including program code portions that when executed by a computer perform the steps of claim 1.

14. A receiver for receiving on a first channel an access control signal carrying access control information and a code which contains a sequence of code symbols and which is orthogonal to one or more further codes in response to an access request signal, comprising:

an estimator for estimating at least one channel estimate from information transmitted on a second different channel using a code symbol at a particular symbol instant;

a compensator to restore a previous power relationship among the individual code symbols contained in the code by determining for the code symbol a compensation value taking into account the at least one channel estimate and for compensating each code symbol using the compensation value determined for the corresponding symbol instant; and an evaluator for evaluating the code on the basis of the sequence of compensated code symbols exploiting the orthogonality to the further codes.

15. The device of claim 14, wherein the receiver is configured as a RAKE receiver.

16. The device of claim 15, wherein the compensator is configured to generate a maximum ratio combined output signal.

* * * * *